Nov. 5, 1963 D. O. GIFFORD 3,109,994

MULTIVIBRATOR AND AMPLIFIER POWERED BY PULSATING D.C.

Filed June 30, 1960

INVENTOR.
Donald O. Gifford

BY C. A. Gulbransen

Atty.

3,109,994
Patented Nov. 5, 1963

3,109,994

MULTIVIBRATOR AND AMPLIFIER POWERED BY PULSATING D.C.

Donald O. Gifford, Brockville, Ontario, Canada, assignor to Automatic Electric Laboratories, Inc., Northlake, Ill., a corporation of Delaware Filed June 30, 1960, Ser. No. 40,083
5 Claims. (Cl. 331—71)

This invention relates to a tone generator in a telephone system, and more particularly to a ring back tone generator.

The object of this invention is to provide a simple, inexpensive ring back tone generator for a small telephone exchange, particularly for use in a system requiring the ring back tone to have frequency components falling within the usual telephone speech band.

It is common practice in small telephone exchanges to use the same generator to supply ringing current to the called line and ring back tone to the calling line. In such arrangements the ringing current is supplied at a low frequency such as 20 c.p.s., and the harmonics of this frequency are relied upon to supply sufficient tone to the calling line. However in systems in which the ring back tone is to be applied over circuits such as carrier this arrangement may not provide sufficient harmonics for satisfactory use. The usual separate ring back tone generator arrangements designed for larger exchanges are too complex and expensive to be economically used in small exchanges.

According to the invention, a ring back generator for use in a telephone system comprises a transistor multivibrator, free running at the frequency within the telephone speech band, which is powered by the full wave rectified output from an interrupted ringing current generator. Since the output from the full wave rectifier is unidirectional current which pulsates at twice the ringing current frequency, the output from the multivibrator is a signal at its free running frequency modulated at a frequency twice that of the ringing current generator.

Advantages resulting from the invention include the following:

The power for the ring back tone generator is supplied by the ringing generator.

By using the output from the ringing generator, full wave rectified without filtering, no separate source of a modulating signal is required.

By applying interrupted generator current as the input power to the ring back tone generator, there is no need for extra relay springs or other switching devices to interrupt its output.

The above-mentioned and other objects and features of this invention and the manner of attaining them will become more apparent, and the invention itself will be best understood, by reference to the following description of an embodiment of the invention taken in conjunction with the accompanying drawings comprising FIGS. 1 and 2 wherein.

Figure 1:
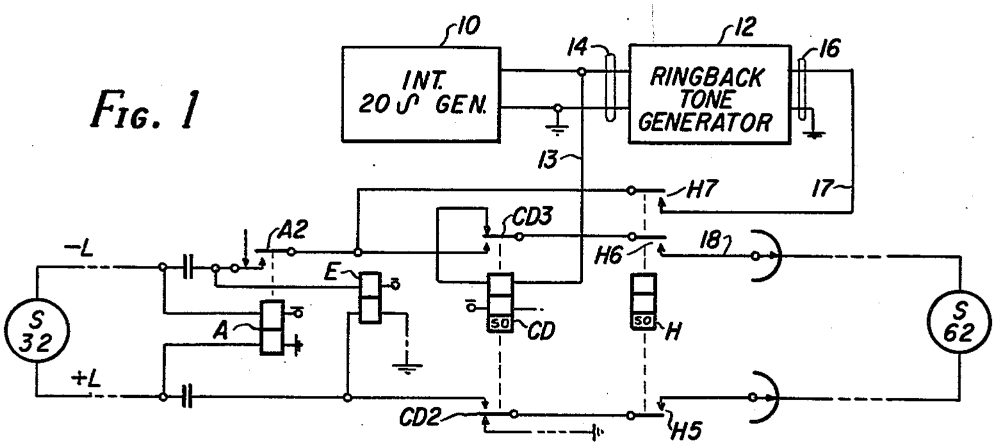
FIG. 1 is a block and schematic diagram of a portion of a telephone system.

FIG. 1 shows a portion of a small telephone system such as that covered by the U.S. patent application of W. Forrest for a Trunk-Connected Private Automatic Branch Exchange, S.N. 843,290, filed September 29, 1959, now Patent No. 2,958,734. The relays and switch shown are a portion of one connector. Relay A is the connector line relay to the calling line loop, relay E is the back-bridge relay for supplying transmission battery to the called line after a call is answered, and relay CD is the ring cut-off relay. After the calling party at station S32 has completed dialling and the called station S62 has been tested and found idle, relay H operates. Interrupted ringing current from generator 10 is then applied over conductor 13, the upper winding of relay CD, contacts CD3, contacts H6, engaged wiper and bank contacts of the connector switch, the subscriber loop to station S62, thence through another wiper and bank contact of the connector switch, contacts H5, contacts CD2, and other contacts not shown to ground. In said prior application, conductor 17 is shown as connected to conductor 18, so that some of the output from the ringing generator is coupled through contacts H7, thence through a capacitor which has been omitted from FIG. 1 of this application, and thence through the contacts A2 and other portions of the exchange, not shown, to supply ring back tone to the calling station S32.

If the ringing current does not supply sufficient harmonics for satisfactory use as ring back tone to meet the requirements of the system, for example if the tone must be applied over circuits such as carrier, a separate ring back tone generator must be provided. In FIG. 1, a ring back tone generator 12 is added to the exchange, and a tone signal from its output 16 is coupled over conductor 17 and through contacts H7 to supply the ring back tone to the calling line. According to the invention, the input power for the tone generator 12 is obtained from the ringing current generator 10 over a connection 14.

Figure 2:
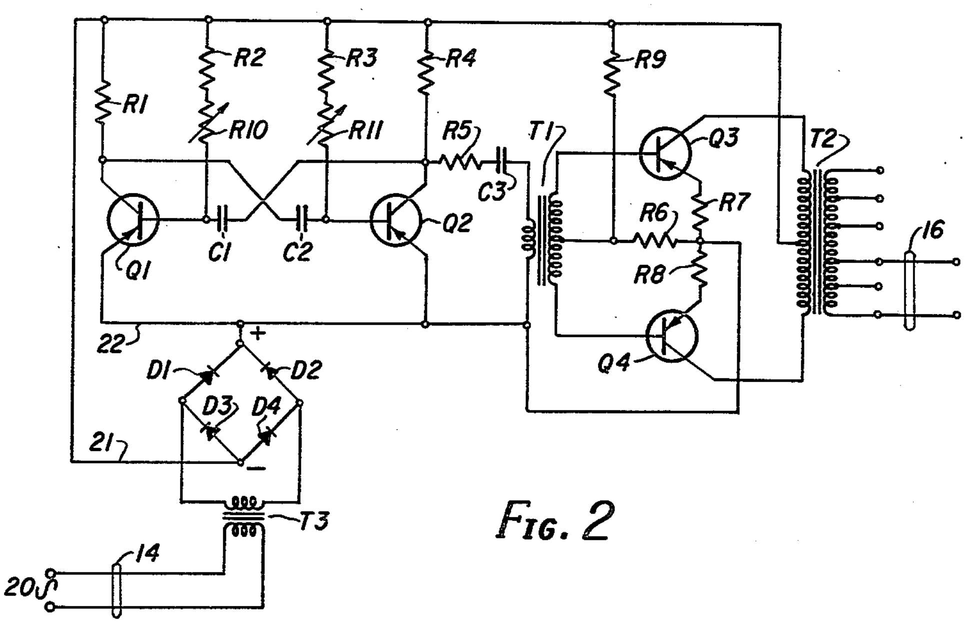
FIG. 2 is a schematic diagram of the ring back tone generator of FIG. 1.

FIG. 2 is a schematic diagram of the ring back tone generator 12. The tone is generated by a free-running symmetrical multivibrator comprising transistors Q1 and Q2, with cross coupling provided by 0.15 microfarad capacitors C1 and C2, with the emitter electrodes of the transistors connected to a conductor 22, and with the collector and base electrodes connected through respective resistances to conductor 21. The connections from conductor 21 to the collector electrodes are through 680-ohm resistors R1 and R4 respectively. In the respective connections from the base electrodes to conductor 21, the resistors R2 and R3 have values of 24,000 ohms and resistors R10 and R11 are 10,000-ohm potentiometers. The transistors Q1 and Q2, as well as transistors Q3 and Q4 in the amplifier, may be type 2N188A.

The signal generated by the multivibrator is coupled from the collector electrode of transistor Q2, through a 1,000-ohm resistor R5, a five microfarad capacitor C3, and the primary winding of transformer T1 to conductor 22. The series network of resistor R5 and capacitor C3 has a filtering effect on higher harmonics and on transients. A class B push pull amplifier comprising transistors Q3 and Q4 is coupled between the secondary winding of transformer T1 and the primary winding of the output transformer T2. In this amplifier, resistor R6 may have a value of 33 ohms, the resistors R7 and R8 each 10 ohms, and resistor R9 12,000 ohms. The output 16 is taken from the secondary winding of transformer T2 which is tapped for impedance matching.

The bias power for operating the multivibrator and amplifier is supplied from a full wave bridge rectifier circuit comprising diodes D1, D2, D3 and D4. Alternating-current potential is applied to the bridge from the secondary winding of a step down transformer T3. The primary winding is supplied from a 20 c.p.s., 90-volt ringing power source connected to conductors 14. No filter is used in the output of the bridge, and therefore the current supplied to the multivibrator and amplifier is unidirectional current which pulsates at 40 impulses per second with a direct-current voltage of 4.5 volts. This pulsing causes the amplitude of the multivibrator and amplifier output to rise and fall 40 times per second. The multivibrator is free running at 420 c.p.s. Therefore the resultant output signal at the secondary of transformer T2 is 420 c.p.s. amplitude modulated at 40 c.p.s.

Since the circuit starts instantly, the applied 20 c.p.s., 90-volt input at conductors 14 may be interrupted, and therefore no separate interrupting arrangement is required at the output 16 from the ring back tone generator 12.

While I have described above the principles of my invention in connection with specific apparatus, it is to be clearly understood that this description is made only by way of example and not as a limitation to the scope of by invention.

What is claimed is:

1. A tone generator for use in a telephone system, said generator comprising a free running multivibrator having a pair of transistors, each having emitter, base and collector electrodes, a pair of capacitors coupling the collector electrode of each transistor to the base electrode of the other, resistance means coupling the base and collector electrodes respectively to a first conductor, and a connection from each of the emitter electrodes to a second conductor; a transistor amplifier coupled between said multivibrator and an output connection, and bias connections from the amplifier to said first and second conductors; a source of alternating current power at a given frequency, and a full wave rectifier arrangement having its input supplied from said source and its output connected to said first and second conductors, to thereby supply unidirectional current pulsating at twice said given frequency to said first and second conductors to supply the only bias power to the multivibrator and amplifier, thereby causing the generation of a signal comprising the multivibrator's free runing frequency modulated at twice said given frequency.

2. A tone generator according to claim 1, wherein the alternating current power from said source is periodically interrupted, thereby causing the signal generated to be similarly interrupted.

3. A tone generator according to claim 1, wherein said rectifier arrangement comprises four diodes connected in a bridge arrangement.

4. A ringback tone generator for use in a telephone system in which a ringing current generator which supplies output power at a given frequency which is periodically interrupted; said ring back tone generator comprising a free running multivibrator having a pair of transistors, each having emitter, base and collector electrodes, a pair of capacitors coupling the collector electrode of each transistor to the base electrode of the other, resistance means coupling the base and collector electrodes respectively to a first conductor, and a connection from each of the emitter electrodes to a second conductor; a transistor amplifier coupled between said multivibrator and an output connection, and bias connections from the amplifier to said first and second conductors; a full wave rectifier arrangement having its input supplied from said ringing current generator and its output connected to said first and second conductors, to thereby supply unidirectional current pulsating at twice said given frequency to said first and second conductors to supply the only bias power to the multivibrator and amplifier, thereby causing the generation of a ringback tone signal comprising the multivibrator's free running frequency modulated at twice said given frequency.

5. A tone generator according to claim 4, wherein said free running frequency is 420 cycles per second, and said given frequency is 20 cycles per second, so that the resulting generated tone is at 420 cycles per second modulated at 40 cycles per second.

References Cited in the file of this patent

UNITED STATES PATENTS

| | | |
|---|---|---|
| 2,584,277 | Long | Feb. 5, 1952 |
| 2,745,008 | Grandstaff | May 8, 1956 |
| 2,843,745 | Smith | July 15, 1958 |
| 2,901,557 | Hubbard | Aug. 25, 1959 |
| 2,951,909 | Bauman | Sept. 6, 1960 |
| 2,966,556 | Hofmann | Dec. 27, 1960 |

OTHER REFERENCES

Electronic Engineering, page 615, October 1958.